Patented July 19, 1938

2,124,299

UNITED STATES PATENT OFFICE 2,124,299

PHTHALOCYANINE DYESTUFF

Karl Holzach and Fritz Muehlbauer, Ludwigshafen-on-the-Rhine, Germany, assignors to General Aniline Works, Inc., New York, N. Y., a corporation of Delaware No Drawing. Application February 10, 1937, Serial No. 125,067. In Germany February 19, 1936

9 Claims. (Cl. 260—12)

The present invention relates to dyestuffs of the phthalocyanine series.

We have found that valuable new dyestuffs are obtained by heating halogen-containing dyestuffs of the phthalocyanine series with organic hydroxyl compounds, if necessary in the form of their metal compounds.

Hydroxyl compounds suitable for the reaction are for example monohydric and polyhydric aliphatic and aromatic alcohols and hydroxy compounds of the benzene, naphthalene and anthracene series. These hydroxyl compounds may also be used in admixture with each other so that when using polyhalogen phthalocyanines, dyestuffs are obtained which may contain different organic radicals attached to the phthalocyanine nucleus by way of oxygen. Derivatives of the said hydroxyl compounds, as for example their nitro, amino and halogen compounds may also be used as initial materials.

Generally speaking the hydroxyl compounds are used in the form of their metal compounds, the alkali metal compounds being especially advantageous. The reaction frequently proceeds by simple heating of the initial mixture. It may also be carried out, however, in the presence of diluents. For this purpose either an excess of the free hydroxyl compound may be used or compounds which do not take part in the reaction, as for example naphthalene, alkylnaphthalenes, aromatic nitrohydrocarbons or tertiary bases, as for example dialkylanilines, pyridine or quinoline may be used. Especially when using volatile initial materials or diluents, it is advantageous to work in a closed vessel, whereby gases which do not take part in the reaction may also be pressed in. Metals may also be used which favor the splitting off of the halogen. For example an advantageous modification of the process consists in dissolving in an alcohol the amount of alkali metal which is later to be exchanged out again, then adding the calculated amount of the halogen-containing phthalocyanine, if desired in the presence of a metal, such as copper or silver powder, and heating the reaction mixture for some time in a closed vessel. When starting from halogen-containing phthalocyanines free from metal, the replacement of the halogen and the introduction of metal into the dyestuff molecule may be carried out in one operation by the simultaneous use of metals capable of forming complexes or of compounds of such metals.

The shade of color of the dyestuffs thus obtainable is usually between blue-green and green. The yields are generally speaking very good. The dyestuffs may be purified, for example by dissolution in and precipitation from sulphuric acid, and they are thus at the same time brought into fine dispersion, if desired with the co-employment of dispersing agents. They are especially valuable as pigment dyestuffs.

The following examples will further illustrate how the said invention may be carried out in practice but the invention is not restricted to these examples. The parts are by weight.

Example 1

A mixture of 7 parts of tetrachlor-copperphthalocyanine, 20 parts of 1-hydroxy-4-methylbenzene, 1.7 parts of finely powdered sodium hydroxide and 0.2 part of copper powder is heated at from 250° to 300° C. in a closed vessel for some hours. After cooling, the excess of 1-hydroxy-4-methylbenzene is washed out with alcohol and the dyestuff dried. In order further to purify it and finely to disperse it, it is dissolved in concentrated sulphuric acid, undissolved constituents are filtered off, the solution is poured onto ice, the dyestuff filtered off by suction, washed, if desired treated with dispersing agent and dried. The dyestuff is obtained in a good yield and its shade of color has been displaced towards green as compared with the initial dyestuff.

Instead of 1-hydroxy-4-methylbenzene, other hydroxy compounds of the benzene series, as for example phenol, other hydroxymethylbenzenes or hydroxydimethylbenzenes may be used.

Example 2

An intimate mixture of 7 parts of tetrachlorcopper-phthalocyanine, 6 parts of 2 - hydroxynaphthalene, 2.5 parts of potassium hydroxide, 0.5 part of copper powder and 10 parts of naphthalene is heated in a closed vessel at 300° C. for some hours. The resulting mass is pulverized, dissolved in concentrated sulphuric acid, freed by filtration from excess of copper and the solution poured onto ice whereby the dyestuff is precipitated as a powerful green powder. It is washed with hot water and acetone or alcohol and dried. The yield amounts to about 10 parts.

Instead of 2-hydroxynaphthalene, 1-hydroxynaphthalene may also be used.

Example 3

7 parts of tetrachlor-copper-phthalocyanine and 0.5 part of copper powder are introduced into a solution of 1 part of metallic sodium (or 1.7 parts of metallic potassium or 2.7 parts of potassium hydroxide) in 15 parts of amyl alcohol.

The mixture is heated for several hours at from 250° to 300° C. in a closed vessel. After cooling, it is diluted with alcohol and the dyestuff formed is filtered off by suction, washed with hot water and dried. Its shade of color is displaced towards green as compared with the initial material. It may be brought into fine dispersion by dissolution in concentrated sulphuric acid and pouring onto ice.

Instead of amyl alcohol, other aliphatic alcohols may be used, as for example butyl alcohol or hexyl alcohol. The reaction may also be so carried out that the calculated amount of alkali alcoholate is used in the presence of a diluent which does not take part in the reaction, naphthalene or alkyl-naphthalenes, for example, being suitable for this purpose.

*Example 4*

An intimate mixture of 7 parts of tetrachlor-copper-phthalocyanine, 5 parts of 1,3-dihydroxybenzene, 5 parts of potassium hydroxide, 10 parts of naphthalene and 0.5 part of copper powder is heated for several hours at about 300° C. in a closed vessel. The whole is then allowed to cool, the solidified mass is powdered, boiled with benzene, toluene or another aromatic hydrocarbon, the residue washed with alcohol or acetone and finally with hot water. The accompanying copper is then removed by boiling the crude dyestuff with dilute hydrochloric acid to which a little potassium chlorate has been added and the dyestuff thus purified is filtered off by suction and washed thoroughly. It may be brought into fine dispersion by dissolution in concentrated sulphuric acid and pouring the solution onto ice or also by grinding in the presence of common salt and introducing the fine powder into water. The dyestuff is brilliant green.

Instead of 1,3-dihydroxybenzene, other hydroxy compounds of the benzene series may be used, as for example 1,4-dihydroxybenzene. In a similar manner, halogen-containing zinc or aluminium phthalocyanines or other halogen-containing metal phthalocyanines may be caused to react.

Halogen-containing phthalocyanines free from metal may also be converted in the said manner into ether-like compounds. In this reaction it is advantageous to effect any desired introduction of a metal in one working operation by the co-employment of a metal capable of forming a complex or a compound of such a metal.

Finally, more highly or less highly halogenated dyestuffs of the phthalocyanine series may be used as initial materials, whereby by using mixtures of different alkali metal alcoholates and more highly halogenated initial dyestuffs, mixed ethers can be prepared.

*Example 5*

A mixture of 32.5 parts of tetrachlor-copper-phthalocyanine, 30 parts of alpha-naphthol, 12 parts of potassium hydroxide, 50 parts of naphthalene and 0.5 part of copper meal is heated at 350° C. for 10 hours in a closed vessel while stirring. After cooling the resulting mass is ground, freed from naphthalene by means of hot toluene or alcohol, whereupon the dyestuff is boiled with dilute hydrochloric acid, washed with water and dried. 45 parts of a green dyestuff are thus obtained which are soluble in part in hot nitrobenzene or trichlorbenzene giving a dark green coloration. It is brought into a state of fine dispersion by dissolving it in strong sulphuric acid and precipitating it by pouring the solution into water. When sulphonating it the dyestuff forms green sulphonic acids.

*Example 6*

A mixture of 20 parts of tetrachlor-phthalocyanine free from metal, 22 parts of alpha-naphthol, 9 parts of potassium hydroxide, 0.5 part of copper meal and 50 parts of naphthalene is heated at 320° C. for 10 hours in a closed copper-lined revolving tube. The resulting mass is freed from naphthalene by means of alcohol, boiled with dilute hydrochloric acid and washed. 17 parts of a green dyestuff are thus obtained which is soluble to some extent in solvents having a high boiling point, such as trichlorbenzene or nitrobenzene. The dyestuff contains copper.

When employing other metals such as iron or zinc, the corresponding metal-containing compounds are obtained.

*Example 7*

A mixture of 50 parts of chlorinated copper-phthalocyanine containing 25 per cent of chlorine, 36 parts of hydroquinone, 16 parts of potassium hydroxide, 1 part of copper meal and 75 parts of naphthalene is heated at 320° C. for 10 hours in a closed vessel. The product thus obtained is purified in the manner described in the preceding examples, 67 parts of a dyestuff having a brilliant green shade of color being thus obtained.

*Example 8*

A mixture of 50 parts of copper-phthalocyanine containing 25 per cent of chlorine, 42 parts of phloroglucin, 20 parts of potassium hydroxide, 1 part of copper meal and 75 parts of naphthalene is heated at 320° C. for 10 hours in a closed vessel. After removing the naphthalene by means of hot alcohol, boiling with dilute hydrochloric acid and washing, 56 parts of a green dyestuff are obtained.

*Example 9*

A mixture of 50 parts of chlorinated copper phthalocyanine containing 25 per cent of chlorine, 125 parts of benzyl alcohol, 16 parts of potassium hydroxide and 1 part of copper meal is heated at 320° C. for 10 hours in a closed vessel. 48 parts of a dyestuff having a pure green shade of color are thus obtained.

*Example 10*

A mixture of 50 parts of a chlorinated copper phthalocyanine containing 25 per cent of chlorine, 40 parts of parahydroxybenzaldehyde, 16 parts of potassium hydroxide, 1 part of copper meal and 75 parts of naphthalene is heated at 320° C. for 10 hours in a closed vessel. After purifying the resulting mass with methyl alcohol and hydrochloric acid, 76 parts of a brilliant green dyestuff are obtained which is soluble to some extent in aromatic solvents having a high boiling point.

*Example 11*

A mixture of 29 parts of 8-hydroxyquinoline, 30 parts of halogenated copper-phthalocyanine containing 25 per cent of chlorine, 10 parts of potassium hydroxide, 0.6 part of copper meal and 45 parts of naphthalene is heated at 350° C. for 10 hours. The resulting mass is first boiled with alcohol, then with dilute hydrochloric acid and the residue is well washed. 39 parts of a beautiful green dyestuff are thus obtained.

Example 12

A mixture of 25 parts of halogenated copper-phthalocyanine containing 25 per cent of chlorine, 38 parts of 1-hydroxyanthraquinone, 9 parts of potassium hydroxide, 0.5 part of copper meal and 38 parts of naphthalene is heated at 350° C. for about 10 hours in a closed vessel. The resulting mass is then boiled with trichlorbenzene, washed with alcohol, then treated with dilute hydrochloric acid and after drying redissolved from strong sulphuric acid. 55 parts of a dark green dyestuff are thus obtained.

Example 13

A mixture of 30 parts of copper-phthalocyanine, containing 5 chlorine atoms per molecule, 35 parts of 1.5-dihydroxynaphthalene, 45 parts of naphthalene, 10 parts of potassium hydroxide and 0.6 part of copper meal is heated at 350° C. for 10 hours in a closed vessel. A green dyestuff is thus obtained which may be purified and brought into a state of fine dispersion according to any of the preceding examples.

Example 14

A mixture of 30 parts of copper-phthalocyanine containing from 4 to 5 atoms of chlorine per molecule, 37 parts of dodecyl alcohol, 10 parts of potassium hydroxide, 0.6 part of copper meal and 45 parts of naphthalene, is heated at 350° C. for about 8 to 10 hours in a closed vessel. The resulting mass is first boiled with alcohol, washed, then treated with dilute hydrochloric acid and again washed. The dyestuff obtained in a yield of 25 parts is a loose green-blue meal, which dissolves readily in benzene, toluene, xylene, nitrobenzene, trichlorbenzene, benzyl alcohol, pyridine and quinoline giving a brilliant green color and is suitable for example for coloring waxes. By dissolving the dyestuff in strong sulphuric acid and pouring the solution into water, the dyestuff is precipitated in the form of brilliant green flakes.

Example 15

A mixture of 30 parts of copper-phthalocyanine containing about 25 per cent of chlorine, 50 parts of cetyl alcohol, 10 parts of potassium hydroxide, 0.6 part of copper meal and 45 parts of naphthalene is heated at 350° C. for several hours in a closed vessel. By purifying the dyestuff as described in Example 14, 31 parts of a loose meal are obtained, which dissolves in organic solvents even better than the dyestuff obtained according to Example 14. It has a brilliant green shade of color. Similar dyestuffs are obtained by using instead of cetyl alcohol myristyl alcohol, octodecenyl alcohol or the alcohols corresponding to the fatty acids contained in coconut oil, sperm oil or palm kernel oil.

Example 16

50 parts of copper phthalocyanine, containing 14 atoms of chlorine per molecule are added to a solution of 5 parts of sodium in 115 parts by volume of amyl alcohol, and the whole is heated at from 300° to 350° C. for about 10 hours in a closed vessel. The dyestuff formed is purified with alcohol and hydrochloric acid. It is a dark green meal which may be brought into a state of fine dispersion by redissolution from sulphuric acid.

Example 17

A mixture of 50 parts of a halogenated copper-phthalocyanine containing about 47 per cent of chlorine, 150 parts of phenol or para-cresol, 39 parts of potassium hydroxide and 1 part of copper meal is heated at 300° C. for several hours. The dyestuff is purified with alcohol, ammonia, hydrochloric acid and water, 24 parts of an olive-green dyestuff thus being obtained.

Example 18

A mixture of 50 parts of chlor-copper-phthalocyanine containing about 45 per cent of chlorine, 16 parts of potassium hydroxide, 0.4 part of copper meal and 150 parts by volume of cyclohexanol is heated at 300° C. for about 10 hours. After treating the mixture in the manner according to any of the preceding examples, an olive-green dyestuff is obtained in an amount of about 25 parts.

Example 19

A mixture of 50 parts of the initial material employed in Example 18, 45 parts of alpha-naphthol, 35 parts of potassium hydroxide, 0.4 part of copper meal and 75 parts of naphthalene is heated for several hours at 350° C. After purifying the resulting mass by means of trichlorbenzene, alcohol, hydrochloric acid and water, a green dyestuff is obtained in a yield of 93 parts.

Example 20

A mixture of 50 parts of copper-phthalocyanine of a high degree of halogenation (chlorine content about 35 percent), 31 parts of resorcin, 16 parts of potassium hydroxide, 0.5 part of copper meal and 75 parts of naphthalene is heated at 320° C. for 10 hours in a pressure-tight vessel. The resulting dyestuff is purified by boiling it with trichlorbenzene, washing with alcohol and aftertreating with dilute hydrochloric acid and water. 58 parts of an olive-green dyestuff are thus obtained.

What we claim is:—

1. A phthalocyanine corresponding to the general formula $$Pht—(O—X)_n$$

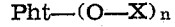

in which Pht stands for the nucleus of a phthalocyanine, X for an organic radical combined with the oxygen atom shown by means of carbon, and $n$ for a whole number up to four.

2. A phthalocyanine corresponding to the general formula $$Pht—(O—X)_n$$

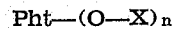

in which Pht stands for the nucleus of a metal-containing phthalocyanine, X for an organic radical combined with the oxygen atom shown by means of carbon, and $n$ for a whole number up to four.

3. A phthalocyanine corresponding to the general formula $$Pht—(O—X)_n$$

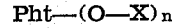

in which Pht stands for the nucleus of copper-phthalocyanine, X for an organic radical combined with the oxygen atom shown by means of carbon, and $n$ for a whole number up to four.

4. A phthalocyanine corresponding to the general formula $$Pht—(O—X)_n$$

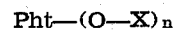

in which Pht stands for the nucleus of copper-phthalocyanine, X for an aromatic radical combined with the oxygen atom shown by means of carbon, and $n$ for a whole number up to four.

5. A phthalocyanine corresponding to the general formula $$Pht—(O—X)_n$$

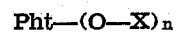

in which Pht stands for the nucleus of copper-phthalocyanine, X for the radical of a hydrocarbon, and $n$ for a whole number up to four.

6. A phthalocyanine corresponding to the general formula $$Pht-(O-X)_n$$

in which Pht stands for the nucleus of copper-phthalocyanine, X for a radical of the benzene series, and $n$ for a whole number up to four.

7. The phthalocyanine corresponding to the formula $$Pht-(O-C_{12}H_{25})_4$$

in which Pht stands for the nucleus of copper phthalocyanine.

8. The phthalocyanine corresponding to the formula

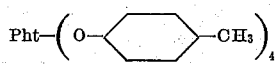

in which Pht stands for the nucleus of copper-phthalocyanine.

9. The phthalocyanine corresponding to the formula

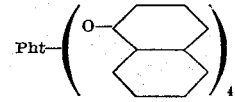

in which Pht stands for the nucleus of copper-phthalocyanine.

KARL HOLZACH.
FRITZ MUEHLBAUER.